Nov. 27, 1923.
W. CLEMMENS ET AL
1,475,254
PIPE REPAIR CLAMP
Filed Dec. 4, 1922
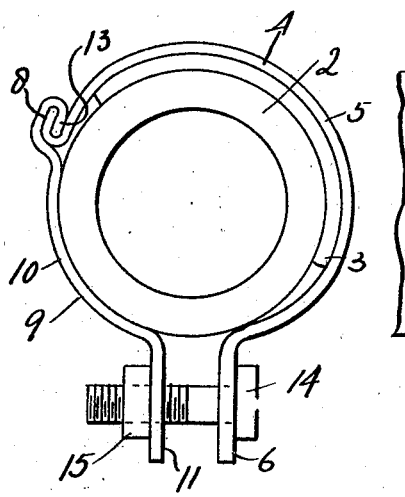
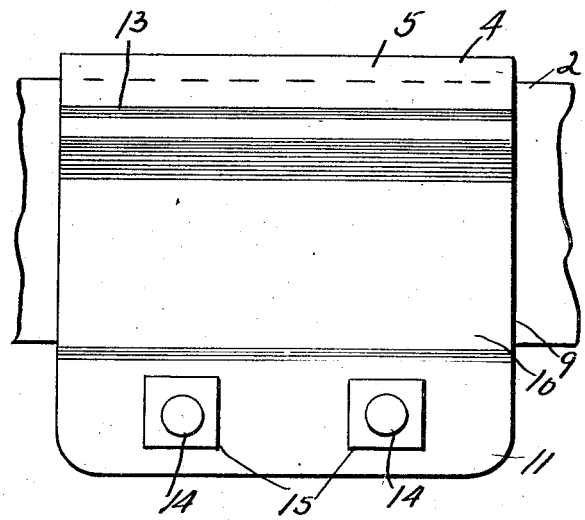
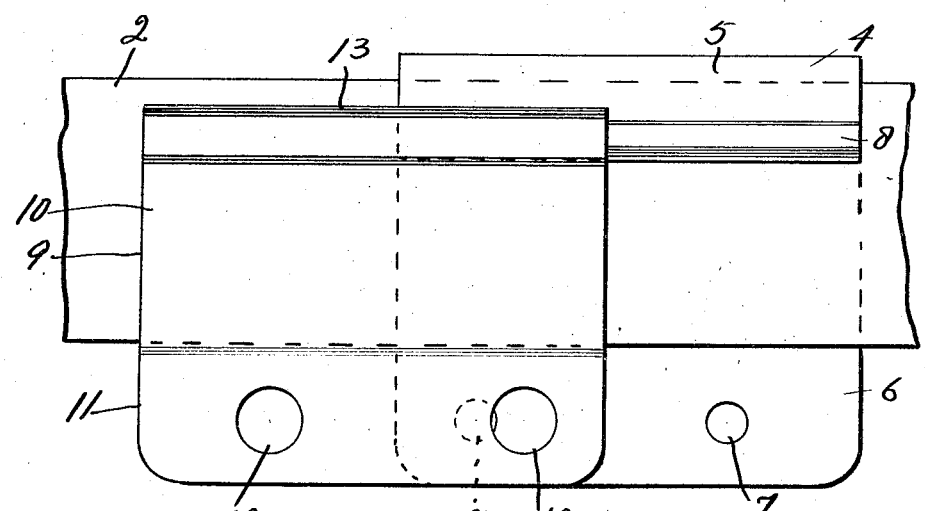
INVENTORS
William Clemmens
Joseph White
By W. W. Williamson Atty.

Patented Nov. 27, 1923.

1,475,254

UNITED STATES PATENT OFFICE.

WILLIAM CLEMMENS AND JOSEPH WHITE, OF PHILADELPHIA, PENNSYLVANIA.

PIPE-REPAIR CLAMP.

Application filed December 4, 1922. Serial No. 604,697.

*To all whom it may concern:*

Be it known that we, WILLIAM CLEMMENS and JOSEPH WHITE, citizens of the United States, residing at 3133 N. 9th Street, Philadelphia, in the county of Philadelphia and State of Pennsylvania, have invented new and useful Improvements in a Pipe-Repair Clamp, of which the following is a specification.

Our invention relates to new and useful improvements in a pipe repair clamp, and has for its primary object to provide an exceedingly simple and effective device of this character which may be readily applied to a pipe so as to cover a crack, hole or other fracture to prevent leakage.

Another object of the invention is to provide a pipe repair clamp consisting of two main sections or clamp elements adapted to be operatively connected by sliding one longitudinally upon the other.

A further object of the invention is to provide in combination with the clamp elements or members a compressible gasket or packing member adapted to be snugly drawn about the pipe by the clamping action.

A still further object of the invention is to provide for a certain amount of "play" between the smaller clamp member and the bolts of equivalent fastening devices.

With these ends in view, this invention consists in the details of construction and combination of elements hereinafter set forth and then specifically designated by the claim.

In order that those skilled in the art to which this invention appertains, may understand how to make and use the same, we will describe its construction in detail, referring by numerals to the accompanying drawings forming a part of this application, in which:—

Fig. 1, is an end view of a pipe showing our invented pipe repair clamp applied thereto.

Fig. 2, is a side elevation thereof.

Fig. 3, is a smaller view with one of the clamp members partially in position.

In carrying out our invention as here embodied 2 represents a pipe which is presumed to have a fracture and in order that the same may be repaired, at least temporary, a suitable compressible packing or gasket member 3 is placed upon the pipe in the region of the fracture so as to cover said fracture and part of the surrounding area of the pipe surface.

Over the packing member is placed the larger clamp member 4 said member comprising the arcuate body portion 5 which extends around the major portion of the pipe's circumference, an outwardly projecting flange 6 along one longitudinal edge of the body, said flange having holes 7 and an outwardly turned back portion forming a guideway 8.

The complementary or smaller clamp member 9 likewise consists of an arcuate body portion 10 with an outwardly projecting flange 11 along one longitudinal edge, said flange having holes 12 of greater diameter than the holes 7 for a purpose to be later explained and an inner back turned portion along its other longitudinal edge to form the guideway 13 for co-action with the guideway 8. These guideways are adapted for sliding engagement, but are so arranged or are of such diameter and shape that one cannot be hooked into the other and can only be engaged by the above mentioned sliding motion.

If the larger clamp member is properly positioned over the gasket the packing or small clamp member is placed against a portion of the pipe opposite that part covered by the larger clamp member but out of alignment therewith and then the guideways 8 and 13 are brought into registration and the smaller clamp member slid endwise or longitudinally until in juxtaposition to the larger clamp member.

The parts being thus properly placed bolts 14 or equivalent fastening devices are inserted in the hole 7 and then through the holes 12 which being larger make it unnecessary that the said holes 12 absolutely align with the holes 7. Nuts 15 are then threaded on to the bolts to cause the two clamp members to be drawn snugly about the pipe as well as the compressing packing or gasket to prevent leakage through the fracture in the pipe. A clamp member constructed as above set forth may be fitted to a number of the different sizes of pipe and the holes 12 being larger than the holes 7 will allow a certain amount of "play" between the bolts and the flange of the smaller clamp member as said flange is drawn toward the flange of the larger clamp member thereby allowing the flange 11 to assume an angular position relative to the bolts.

Of course we do not wish to be limited to the exact details of construction as herein shown as these may be varied within the limits of the appended claim without departing from the spirit of our invention.

Having thus fully described our invention, what we claim to be new and useful is:—

A pipe repair clamp comprising in combination, a large clamp member consisting of an arcuate body, an outwardly projecting flange along one longitudinal edge of said body, said flange having holes therein, and an outer back turned portion forming a guideway along the other longitudinal edge of said body, a small or complementary clamp member consisting of an arcuate body, an inner back turned portion forming a guideway along one longitudinal edge of the last named body and adapted for co-action with the guideway of the larger clamp member by longitudinal or endwise sliding movement and an outwardly projecting flange along the other longitudinal edge of the body of the small member, said flange having holes therein of larger diameter than the holes in the first named flange, a compressible packing for interposition between the larger clamp member and a pipe to which the device is attached, bolts inserted through the holes in the flanges and nuts threaded on said bolts whereby the flanged edges of the clamp members may be drawn toward each other.

In testimony whereof, we have hereunto affixed our signatures.

JOSEPH WHITE.
WILLIAM CLEMMENS.